(12) United States Patent
Deshpande

(10) Patent No.: US 7,574,514 B2
(45) Date of Patent: Aug. 11, 2009

(54) SYSTEMS AND METHODS FOR IDENTIFYING ORIGINAL STREAMS OF MEDIA CONTENT

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 857 days.

(21) Appl. No.: 10/675,033

(22) Filed: Sep. 30, 2003

(65) Prior Publication Data

US 2005/0086355 A1 Apr. 21, 2005

(51) Int. Cl.
G06F 15/16 (2006.01)
(52) U.S. Cl. .................... 709/231; 709/203; 709/219
(58) Field of Classification Search ............. 709/231, 709/203, 219
See application file for complete search history.

(56) References Cited

U.S. PATENT DOCUMENTS

| | | | | |
|---|---|---|---|---|
| 7,058,720 | B1* | 6/2006 | Majidimehr | 709/231 |
| 7,076,478 | B2* | 7/2006 | O'Rourke et al. | 707/3 |
| 7,194,091 | B2* | 3/2007 | Higashi et al. | 380/202 |
| 7,209,874 | B2* | 4/2007 | Salmonsen | 703/23 |
| 7,286,651 | B1* | 10/2007 | Packingham et al. | 379/88.14 |
| 2002/0027569 | A1* | 3/2002 | Manni et al. | 345/764 |
| 2002/0078006 | A1* | 6/2002 | Shteyn | 707/1 |
| 2002/0078149 | A1* | 6/2002 | Chang et al. | 709/203 |
| 2002/0124082 | A1* | 9/2002 | San Andres et al. | 709/225 |
| 2003/0005130 | A1 | 1/2003 | Cheng | |
| 2003/0174841 | A1* | 9/2003 | Nault et al. | 380/277 |
| 2004/0049598 | A1* | 3/2004 | Tucker et al. | 709/246 |
| 2004/0083273 | A1* | 4/2004 | Madison et al. | 709/217 |
| 2004/0098463 | A1* | 5/2004 | Shen et al. | 709/213 |
| 2004/0162871 | A1* | 8/2004 | Pabla et al. | 709/201 |
| 2004/0267954 | A1* | 12/2004 | Shen | 709/231 |

(Continued)

FOREIGN PATENT DOCUMENTS

JP 2002-077913 3/2003

(Continued)

OTHER PUBLICATIONS http://www.upnp.org/download/ContentDirectory%201.0.prtad.pdf "UpnP Content Directory Service ContentDirectory:1" Service Template Version 1.01 For Universal Plug and Play Version 1.0, Date: Jun. 25, 2002.

(Continued)

*Primary Examiner*—William C Vaughn, Jr.
*Assistant Examiner*—Joiya M Cloud
(74) *Attorney, Agent, or Firm*—Austin Rapp & Hardman

(57) ABSTRACT

Systems and methods for identifying original streams of media content are disclosed. An exemplary method involves identifying at least one media content identifier in a media content directory. The media content identifier identifies media content. A plurality of stream access identifiers may be associated with the media content identifier. The method also involves identifying at least one stream access identifier of the plurality of stream access identifiers that includes access information for accessing an original stream of data from a media file comprising the media content. The method also involves providing identifier information about the at least one stream access identifier to a client in response to a client request.

18 Claims, 9 Drawing Sheets

U.S. PATENT DOCUMENTS

2005/0033850 A1* 2/2005 Kirkland ................. 709/228
2005/0086300 A1* 4/2005 Yeager et al. ............. 709/204

FOREIGN PATENT DOCUMENTS

WO  WO 01/22406  3/2001
WO  WO 02/058394  7/2002

OTHER PUBLICATIONS

"DENi Architecture" CEA/DENi: Doc. No.: Draft CEA-#TBD, v0.03, Sep. 3, 2003.

http://www.upnp.org/download/UPnPDA10_20000613.htm Universal Plug and Play Device Architecture, Version 1.0, Jun. 8, 2000.

* cited by examiner

SYSTEMS AND METHODS FOR IDENTIFYING ORIGINAL STREAMS OF MEDIA CONTENT

TECHNICAL FIELD

The present invention relates generally to digital media technology. More specifically, the present invention relates to ways in which media content that is stored on or accessible from a media server may be accessed.

BACKGROUND

One way in which digital media may be distributed to a consumer is commonly referred to as "streaming." Digital media data may be transmitted from a server to a client over a one or more computer networks. When a client requests a digital media file from a server, the client typically provides the server with the address of the media file, such as the Universal Resource Locator (URL) of the media file. The server then accesses the media file and sends it to the client as a continuous data stream. Streaming media is often sent in compressed form over the network, and is generally played by the client as it arrives. With streaming media, client users typically do not have to wait to download a large media file before seeing and/or hearing the media file. Instead, the data from a media file is sent in a continuous stream and is played as it arrives.

Many devices within a home network contain various types of digital media content that other devices would like to access. As an example, a personal computer and/or personal video recorder might contain a significant portion of the homeowner's audio, video, and still-image library. Such "media server" devices may be equipped with an implementation of a "content directory service." The content directory service allows the homeowner to browse the content that is accessible to the media server, select a specific piece of content, and cause it to be played on an appropriate rendering device (e.g., an audio player for music objects, a TV for video content, an Electronic Picture Frame for still-images, etc). For maximum convenience, it is desirable to allow the homeowner to initiate these operations from a variety of consumer electronic devices, such as personal computers, televisions, set-top boxes, PDAs, DVD/CD players, MP3 players, stereo systems, VCRs, camcorders, digital cameras, etc.

In order to be compatible with as many client devices in the UPnP home network as possible, a media server device may be configured to perform protocol and/or format conversion of media content. For example, consider an Internet radio station using RTSP/RTP/UDP. To accommodate client devices that can only play via HTTP, a media server could provide protocol translation from RTSP/RTP/UDP to HTTP. Format conversion is required by some home networking standards like Digital Entertainment Network Initiative (DENi), Consumer Electronics Association (CEA) R 7.6 Digital Entertainment Network (and likely Digital Home Working Group—DHWG) which are built using Universal Plug and Play (UPNP) technology. These standards require that a UPnP AV Media Server transcode the media content to a common format to support a UPnP AV Media Renderer (e.g., a DENi media player), which otherwise may not have the ability to decode some media types. The ability of a media server device to perform transcoding and/or protocol translation improves interoperability and is therefore beneficial from the consumer point of view.

When media data from a media file is streamed from a media server to a client device without transcoding or protocol conversion, this is referred to as an "original stream." When transcoding and/or protocol conversion are performed, this is referred to as a "non-original stream." The media server expends computational resources to perform protocol translation and/or transcoding. In addition, the quality of a transcoded stream is typically worse than the quality of the original stream. Accordingly, benefits may be realized by systems and methods for identifying ways for client systems to access an original stream of media content.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
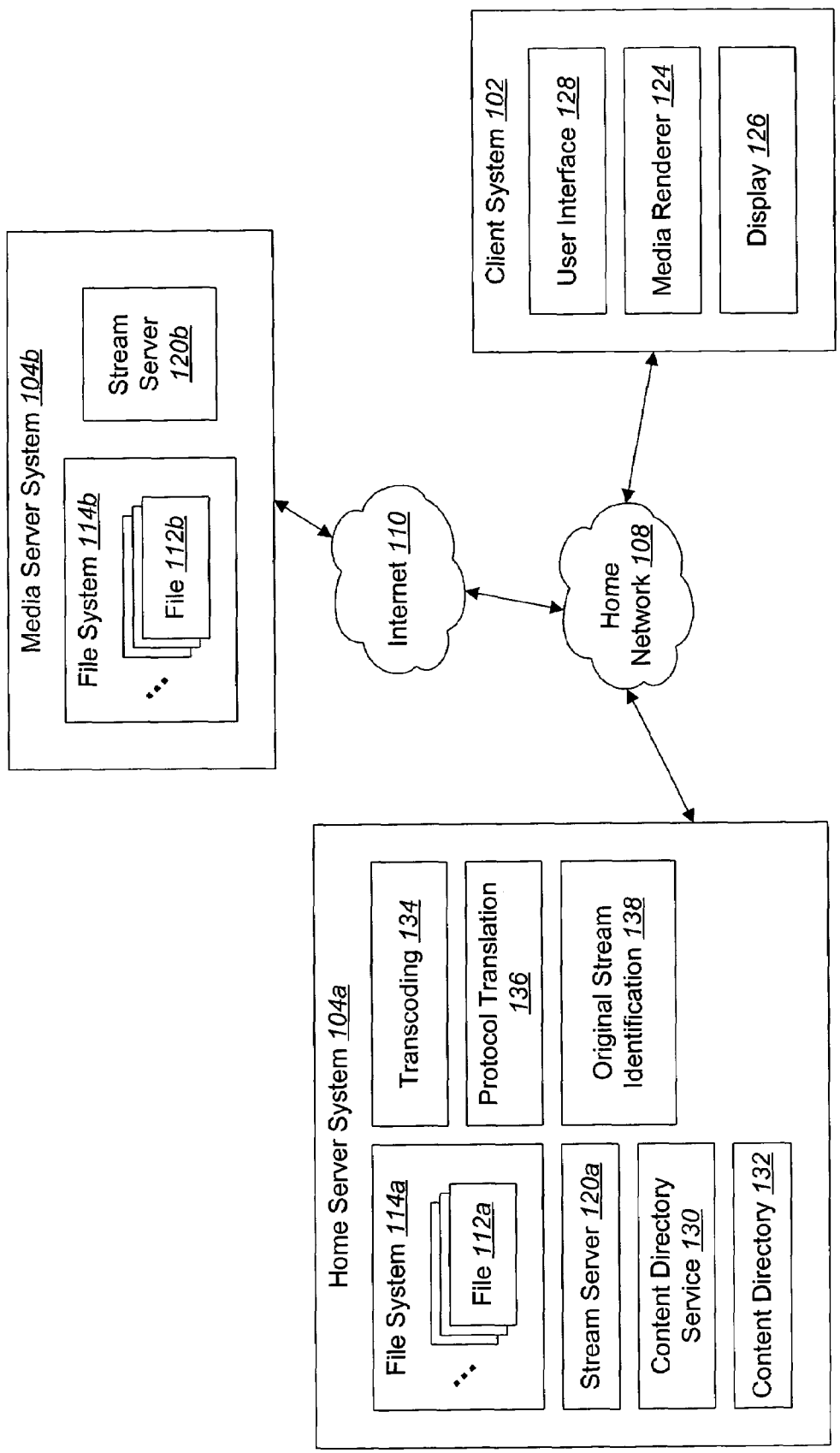
FIG. 1 is a block diagram illustrating an exemplary operating environment in which some embodiments may be practiced.

A method in a server system is disclosed. The method involves identifying at least one media content identifier in a media content directory. The media content identifier identifies media content. A plurality of stream access identifiers are associated with the media content identifier. The method also involves identifying at least one stream access identifier of the plurality of stream access identifiers that includes access information for accessing an original stream of media data from a media file comprising the media content. The method also involves providing identifier information about the at least one stream access identifier to a client in response to a client request.

Identifying the at least one stream access identifier may involve receiving user input. Alternatively, identifying the at least one stream access identifier may involve matching a characteristic of the at least one stream access identifier to a similar characteristic of the media file. Alternatively still, identifying the at least one stream access identifier may involve applying a rule to the plurality of stream access identifiers.

In some embodiments, the original stream of the media data from the media file is provided to the client without protocol translation or format conversion being performed by the server system. The access information may include a uniform resource identifier for the media file. The media content directory may be maintained by a Universal Plug and Play content directory service implementation.

A server system is also disclosed. The server system includes a content directory service implementation and a media content directory maintained by the content directory service implementation. The media content directory may include a media content identifier identifying media content. The media content directory may also include a plurality of stream access identifiers associated with the media content identifier. The media content directory may also include an original stream identification (OSI) service implementation. The OSI service implementation may be configured to identify at least one stream access identifier of the plurality of stream access identifiers that includes access information for accessing an original stream of media data from a media file comprising the media content. The OSI service implementation may be further configured to provide identifier information about the at least one stream access identifier to a client in response to a client request.

In some embodiments, the original stream of the media data from the media file may be provided to the client without protocol translation or format conversion being performed by the server system. The access information may include a uniform resource identifier for the media file.

Identifying the at least one stream access identifier may involve receiving user input. Alternatively, identifying the at least one stream access identifier may involve matching a characteristic of the at least one stream access identifier to a similar characteristic of the media file. Alternatively still, identifying the at least one stream access identifier may involve applying a rule to the plurality of stream access identifiers.

A set of executable instructions for implementing a method in a server system is also disclosed. The method may involve identifying at least one media content identifier in a media content directory. The media content identifier identifies media content. A plurality of stream access identifiers are associated with the media content identifier. The method may also involve identifying at least one stream access identifier of the plurality of stream access identifiers that includes access information for accessing an original stream of media data from a media file comprising the media content. The method may also involve providing identifier information about the at least one stream access identifier to a client in response to a client request.

In some embodiments, the original stream of the media data from the media file may be provided to the client without protocol translation or format conversion being performed by the server system. The access information may include a uniform resource identifier for the media file.

Identifying the at least one stream access identifier may involve receiving user input. Alternatively, identifying the at least one stream access identifier may involve matching a characteristic of the at least one stream access identifier to a similar characteristic of the media file. Alternatively still, identifying the at least one stream access identifier may involve applying a rule to the plurality of stream access identifiers.

The media content directory may include an attribute that specifies whether a particular stream access identifier corresponds to the original stream. The at least one stream access identifier may include the attribute.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software stored on a computer-readable medium, electronic hardware, or combinations of both. To clearly illustrate this interchangeability of hardware and software stored on a computer-readable medium, various components will be described generally in terms of their functionality. Whether such functionality is implemented as hardware or software stored on a computer-readable medium depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating an exemplary operating environment in which some embodiments may be practiced. As shown, embodiments disclosed herein may involve interaction between a client system 102, a home server system 104*a*, and/or a media server system 104*b*. In typical embodiments, the client system 102 and the home server system 104*a* are located within an individual's home. The client system 102 and the home server system 104*a* may take the form of consumer electronic devices, examples of which include personal computers, televisions, set-top boxes, PDAs, DVD/CD players, MP3 players, stereo systems, VCRs, camcorders, digital cameras, etc.

The client system 102 and the home server system 104a are in communication with one another via a home network 108. A variety of different network configurations and protocols may be used, including Ethernet, IEEE 802.11, IEEE 802.16, Bluetooth, etc. The client system 102 and the home server system 104a are in communication with the media server system 104b via the Internet 110.

Media files 112a are stored in a file system 114a on the home server system 104a. Additional media files 112b are stored in a file system 114b on the media server system 104b. Sometimes streaming media may not be stored as files, and the streaming media data may be generated live in real-time. Also one media stream may be comprised of multiple files or one file may correspond to multiple media streams. The media files 112 correspond to media content, such as videos, songs, images, etc. Sometimes, more than one media file 112 corresponds to the same media content, as will be explained in greater detail below. Stream servers 120 on the home server system 104a and the media server system 104b are configured to "stream" the media files 112 to the client system 102, i.e., send data from the media files 112 to the client system 102 as a continuous stream. A media rendering component 124 on the client system 102 converts the streaming media that it receives into text, graphics, and/or moving images (as appropriate) shown on a display device 126. Users of the client system 102 may request data from particular media files 112 via a user interface 128.

The home server system 104a includes an implementation of a content directory service 130. The content directory service 130 provides a mechanism for a user of the client system 102 to browse the media content or search for media content that is accessible to the home server system 104a and to obtain information about that content. This is typically accomplished by means of a content directory 132. Additional details about an exemplary content directory service 130 that may be used with embodiments disclosed herein are provided in the Universal Plug and Play (UPnP) Content Directory Service ContentDirectory:1 Service Template Version 1.01 For Universal Plug and Play Version 1.0, which is hereby incorporated by reference in its entirety.

The home server system 104a also includes a transcoding component 134. The transcoding component 134 performs the function of translating the data from a media file 112 on the home server system 104a to a different format before the data from that media file 112 is streamed to the client system 102. There are a variety of reasons why transcoding may occur. For example, home networking standards (like the Digital Entertainment Network Initiative (DENi), Consumer Electronics Association (CEA) R 7.6 Digital Entertainment Network, etc.) which are built using UPnP technology require that a upnP AV Media Server transcode media content to a common format to support a UPnP AV Media Renderer (e.g., a DENi media player), which otherwise may not have the ability to decode some media types.

The home server system 104a also includes a protocol translation component 136. The protocol translation component 136 receives the data from a media file 116 that is streamed from the media server system 104b and that is destined for the client system 102. The data from media file 116 is streamed from the media server system 104b according to a particular protocol. If the client system 102 cannot receive data according to the protocol used by the stream server 122 on the media server system 104b, the protocol translation component 136 then streams the data from the media file 116 to the client system 102 in accordance with a protocol that the client system 102 can understand. In some embodiments, the protocol translation may be performed for media that is streaming from another home server system inside the home that is similar to the home server system 104a. In some embodiments, transcoding may be performed for media streaming from the media server 104b. In some embodiments, the transcoding may be performed by the media server 104b itself. In some embodiments, transcoding may be a trans-rating operation where only the media stream's bitrate is changed but the media format remains the same. In some embodiments, both media transcoding and protocol translation may be performed.

When the data from a media file 112 is streamed from a server (either the stream server 120a on the home server system 104a or the stream server 120b on the media server system 104b) to the client system 102 without transcoding or protocol conversion, this is referred to as an "original stream." When transcoding and/or protocol conversion are performed, this is referred to as a "non-original stream."

The home server system 104a also includes an original stream identification (OSI) component 138. In general terms, where media content is available through at least one original stream and at least one non-original stream, the OSI component 138 helps the client system 102 to select an original stream. The OSI component 138 will be described in greater detail below.

Figure 2:
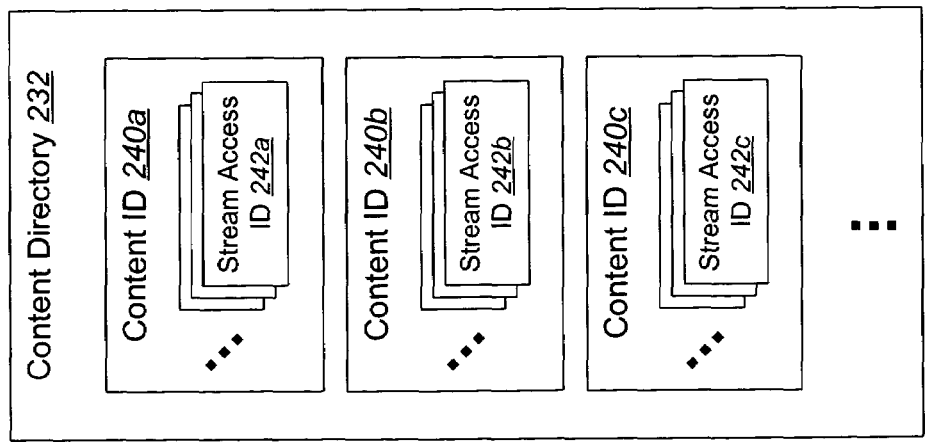
FIG. 2 is a block diagram illustrating an embodiment of a content directory.

FIG. 2 is a block diagram illustrating an embodiment of a content directory 232. The content directory 232 includes a listing of content identifiers 240. Each content ID 240 identifies a particular piece of media content that is accessible to the home server system 104a. For example, a first content ID 240a might identify a song stored on the media server system 104a, a second content ID 240b might identify a video stored on the web server system 104b, and so forth.

The content IDs 240 may be associated with one or more stream access identifiers 242. Each stream access ID 242 includes information for accessing a stream of data from media file 112 that includes the media content identified by the corresponding content item ID 240. In some implementations of the content directory service 130, a stream access ID 242 in the content directory 232 may take the form of a resource element, which is often referred to as a <res> element or simply as <res>. A stream access ID 242 may include the uniform resource identifier (URI) of a media file 112 that includes the media content.

The user of a client system 102 may browse the content directory 232 and select media content that is to be streamed to the client system 102. This is typically done by selecting the content ID 240 corresponding to the desired content. If there is more than one stream access ID 242 associated with the same content ID 240, one of the stream access IDs 242 is selected. Typically, it is preferable to select a stream access ID 242 corresponding to an original stream, if possible (i.e., if the client system 102 is capable of receiving the data from the corresponding media file 112 in its current format and without protocol translation).

Currently, however, the client system 102 is unable to distinguish between stream access IDs 242 that correspond to original streams and stream access IDs 242 that correspond to non-original streams. The OSI component 138 on the home server system 104a helps the client system 102 to perform this function. More specifically, the OSI component 138 identifies which of the stream access IDs 242 associated with a particular content ID 240 correspond to original streams and which correspond to non-original streams.

Figure 3:
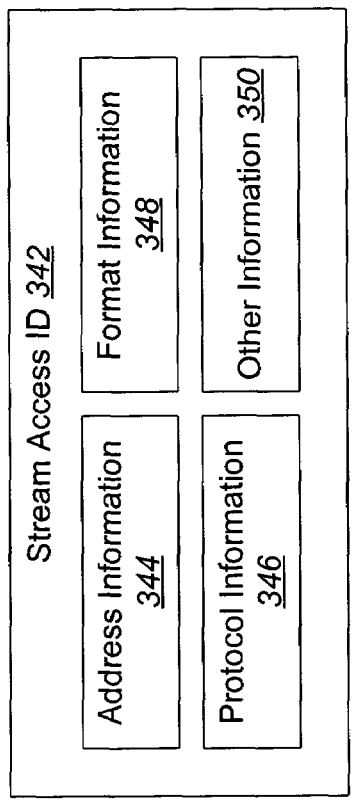
FIG. 3 is a block diagram illustrating an embodiment of a stream access ID.

FIG. 3 is a block diagram illustrating an embodiment of a stream access ID 342. The stream access ID 342 includes address information 344, protocol information 346, and format information 348. Of course, the stream access ID 242 may include other information 350 as well. The address information 344 may include the URI for the media file 112. The media file 112 may be stored on the home server system 104a, on the media server system 104b, or on some other device that is accessible to the home server system 104a.

The protocol information 346 specifies the protocol that is followed to stream the data from media file 112 to the client system 102. The format information 348 specifies the format of the media file 112 data that is to be streamed to the client system 102. Where the address information 344 includes a filename, the format information 348 may be contained in the file extension of the filename. Where the stream access ID 242 takes the form of a <res> element, the address information 344 and protocol information 346 may be contained in the protocolInfo attribute of the <res> element. The other information 350 may take the form of other attributes of the <res> element, such as the size attribute.

Figure 4:
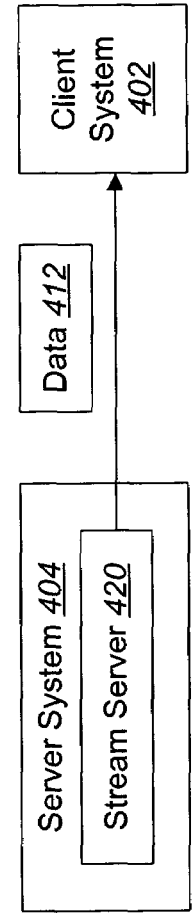
FIG. 4 is a block diagram illustrating an example of an original stream.

FIG. 4 is a block diagram illustrating an example of an original stream. As shown, an original stream occurs when a stream server 420 on a server system 404 streams data from a media file 412 to the client system 402 without transcoding or protocol translation being performed on the media file data 412.

Figure 5:
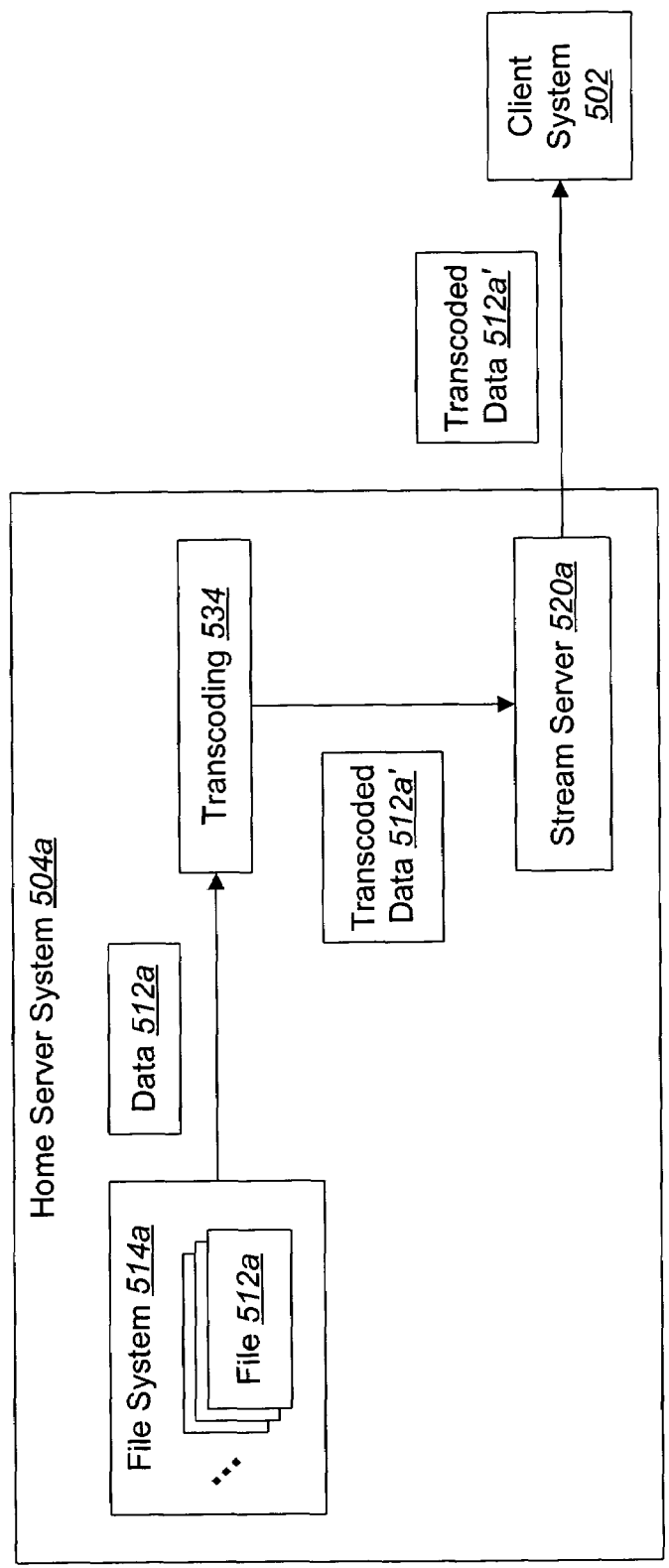
FIG. 5 is a block diagram illustrating an example of a non-original stream.

FIG. 5 is a block diagram illustrating an example of a non-original stream. The data from media file 512a is provided to the transcoding component 534. The transcoding component 534 transcodes the data from media file 512a into a different format (i.e., converts the format of the data from media file 512a), thereby creating transcoded media file data 512a'. The transcoding may be done in real-time or it may be done off-line. The transcoded media file data 512a' is provided to the stream server 520a. The stream server 520a streams the transcoded media file data 512a' to the client system 502.

Figure 6:
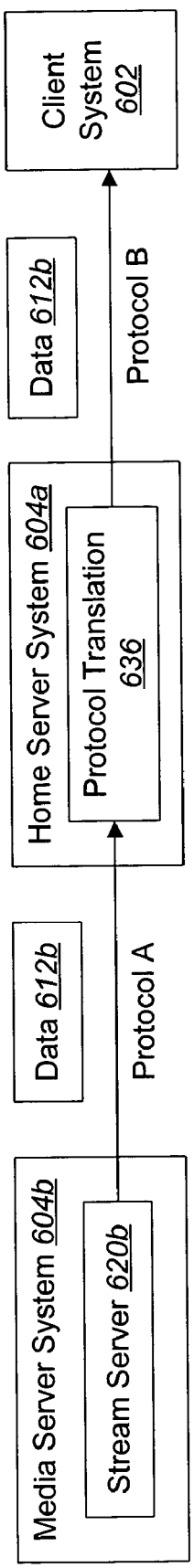
FIG. 6 is a block diagram illustrating another example of a non-original stream.

FIG. 6 is a block diagram illustrating another example of a non-original stream. The stream server 620b on the media server system 604b streams data from a media file 612b to the home server system 604a. The media file 612b is destined for the client system 602. The media file data 612b is streamed to the home server system 604a in accordance with a particular protocol, designated protocol A in FIG. 6. The protocol translation component 636 then performs protocol translation and streams the media file data 612b to the client system 602 in accordance with a different protocol, designated protocol B in FIG. 6.

For example, suppose the stream server 620b is a Real Time Streaming Protocol (RTSP) server 620b. Further suppose that the client system 602 is not configured to receive RTSP streams, but is configured to receive data via HTTP. In such a situation, the protocol translation component 636 receives the media file data 612b from the stream server 620b via RTSP and provides the same media file data 612b to the client system 602 via HTTP.

Figure 7:
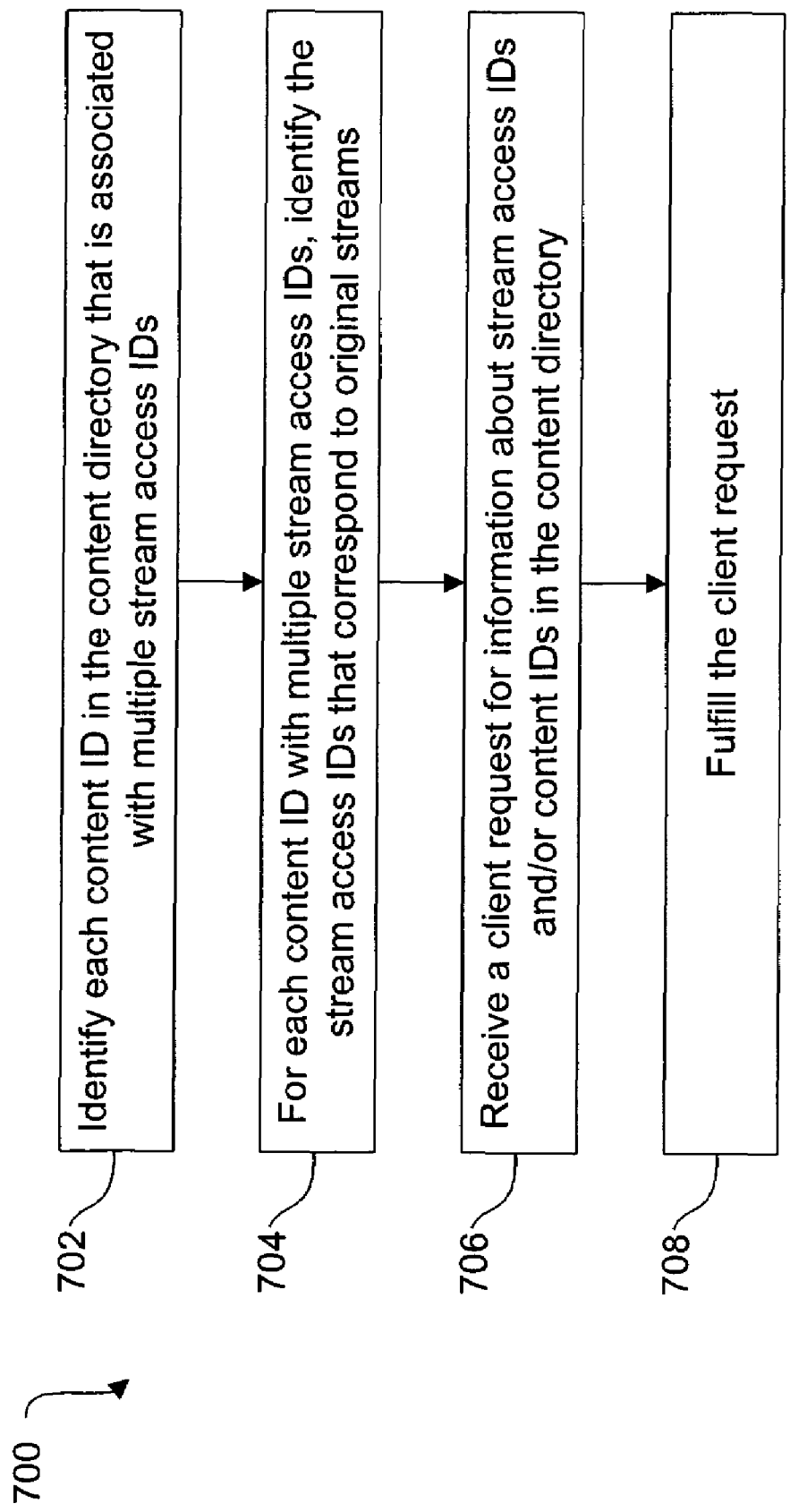
FIG. 7 is a flow diagram illustrating a method that may be performed by an embodiment of an original stream identification component.

FIG. 7 is a flow diagram illustrating a method 700 that may be performed by an embodiment of the OSI component 138. During an initial configuration of the content directory 132, the OSI component 138 identifies 702 each content ID 240 in the content directory 132 that is associated with multiple stream access IDs 242. For each content ID 240 that has multiple stream access IDs 242, the OSI component 138 identifies 704 the stream access IDs 242 that correspond to an original stream. Several examples of ways in which this may be accomplished will be provided below.

Once the initial configuration is performed, the OSI component 138 may receive 706 and fulfill 708 client requests for information about the stream access IDs 242 in the content directory 132. For example, the OSI component 138 may receive 706 and fulfill 708 a request to determine whether a particular stream access ID 242 corresponds to an original stream. As another example, the OSI component may receive 706 and fulfill 708 a request to return all of the stream access IDs 242 that are associated with a particular content ID 240 and that correspond to an original stream. Steps 706 and 708 of the method 700 may be implemented as UPnP actions that may be invoked by the client system 102.

Figure 8:
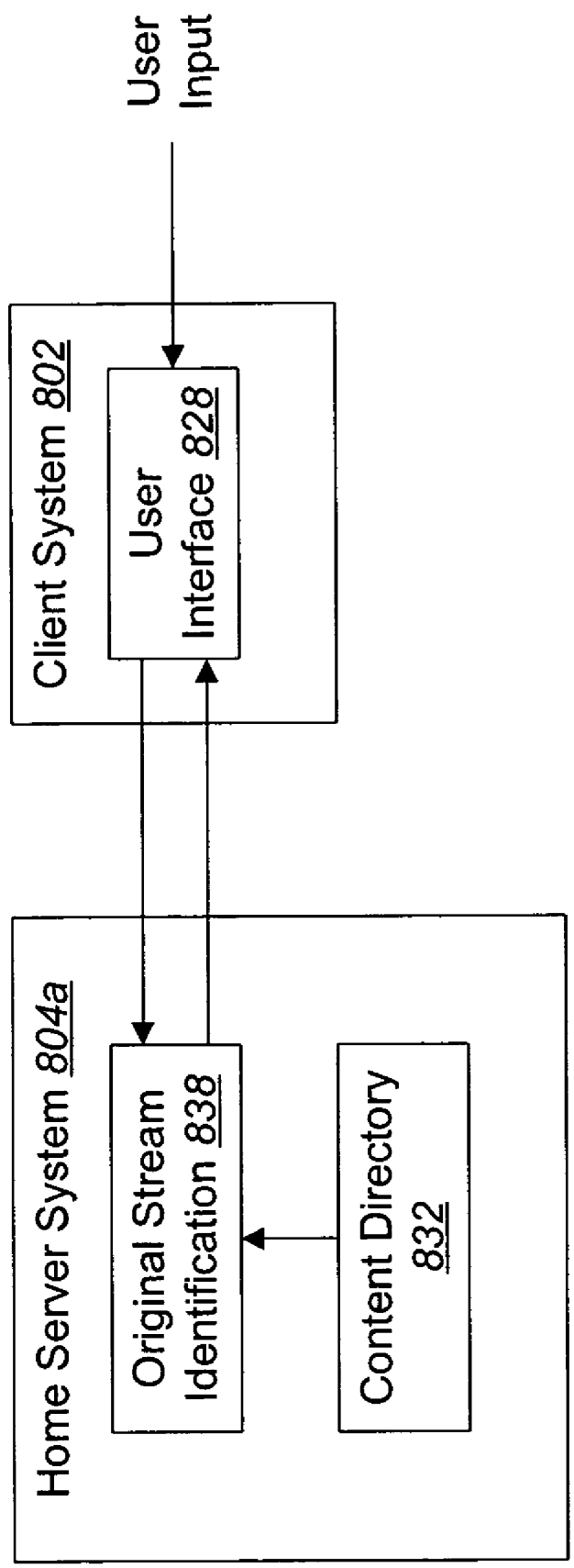
FIG. 8 is a functional block diagram illustrating an exemplary way that the original stream identification component identifies stream access identifiers that correspond to an original stream.

FIG. 8 is a functional block diagram illustrating an exemplary way that the OSI component 838 identifies the stream access IDs 242 that correspond to an original stream. The OSI component 838 identifies each content ID 240 in the content directory 832 that is associated with multiple stream access IDs 242. The identified content IDs 240 and stream access IDs 242 are then communicated to a user of the client system 802 via the user interface 828. The user may be a content creator and is typically a person who has knowledge about which stream is an original stream. This may be based on the knowledge of, for example, which items were downloaded or copied by the user. The user specifies which of the stream access IDs 242 correspond to an original stream via the user interface 828. This user input is then provided to the OSI component 838.

Figure 9:
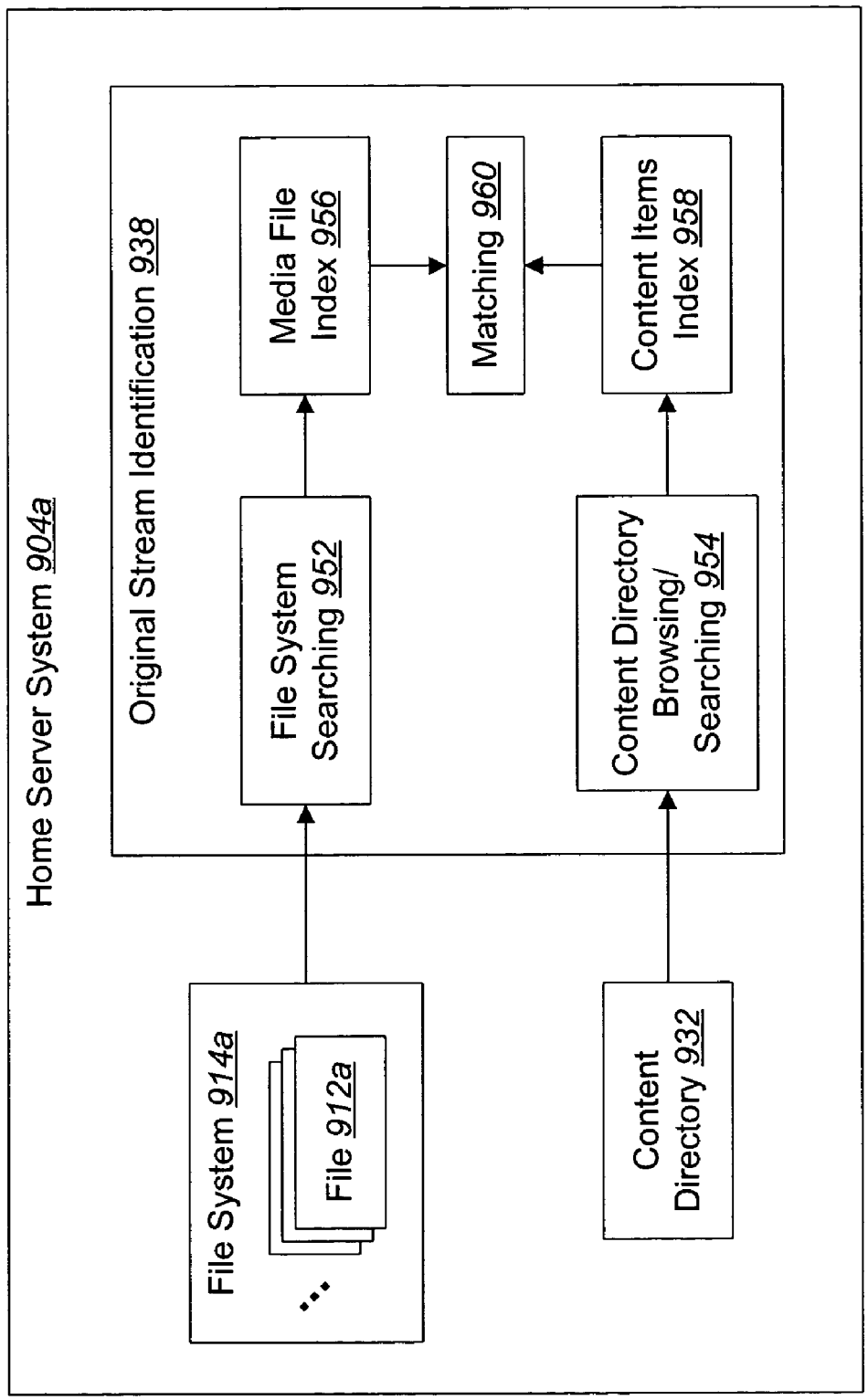
FIG. 9 is a functional block diagram illustrating another exemplary way that the original stream identification component identifies the stream access IDs that correspond to an original stream.

FIG. 9 is a functional block diagram illustrating another exemplary way that the OSI component 138 identifies the stream access IDs 242 that correspond to an original stream. An OSI component 138 that implements the approach shown in FIG. 9 can be run manually or can be set to run automatically at scheduled intervals.

The OSI component 938 includes a file system searching component 952 and a content directory browsing/searching component 954. The file system searching component 952 builds a media file index 956 of available media files 912a on the file system 914a. The content directory browsing/searching component 954 builds a content items index 958 of content IDs 240 in the content directory 132 that are associated with more than one stream access ID 342. The media file index 956 and the content items index 958 are provided to a matching component 960. The matching component 960 tries to match a characteristic of available media files 912a in the media file index 956 to information about stream access IDs 242 in the content items index 958. If a match is found between a particular media file 912a and a stream access ID 242 of a content ID 240, then it may be concluded that the stream access ID 242 corresponds to an original stream.

As an example of this approach, if the content directory 932 is a UPnP content directory 932 provided by a UPnP content directory service 930, the matching component 960 may try to match the size attribute of a <res> element with the size of a media file 912a listed in the media file index 956. If the matching component 960 knows the URI convention for the UPnP content directory service 930, it can then look in a fixed folder location for this matching.

Figure 10:
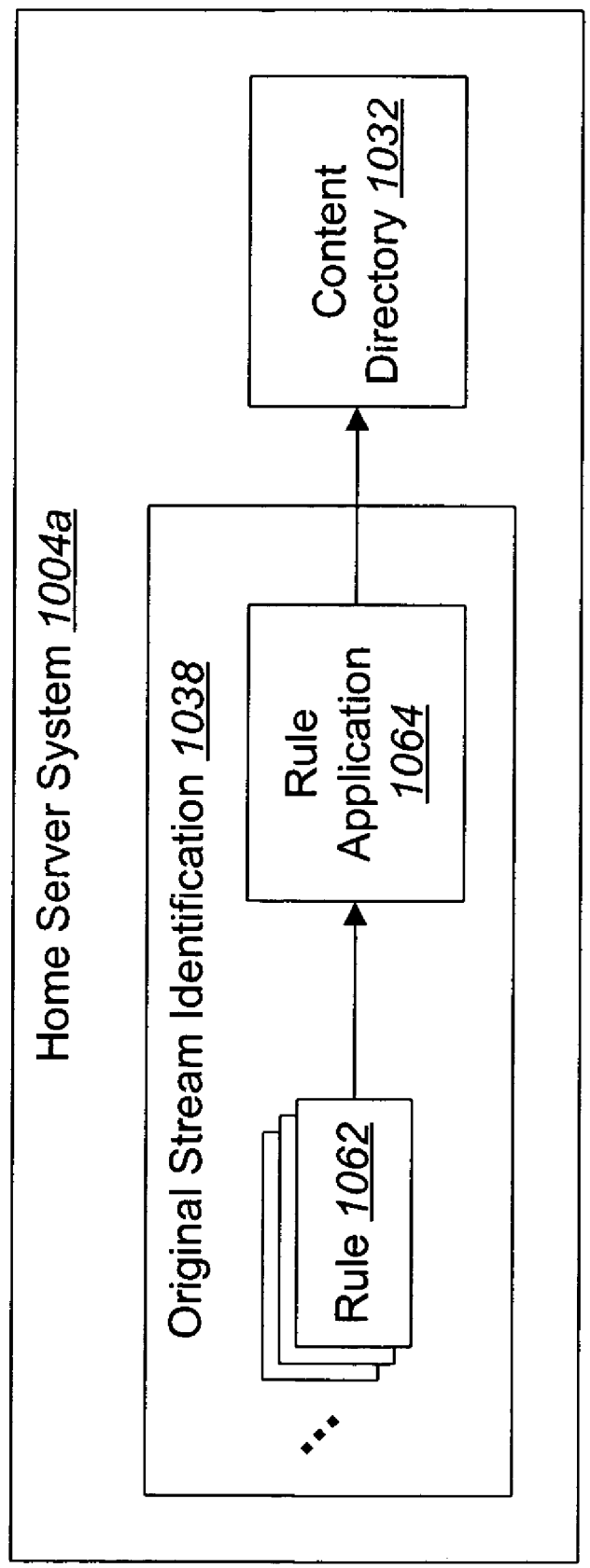
FIG. 10 is a functional block diagram illustrating another exemplary way that the original stream identification component identifies the stream access IDs that correspond to an original stream.

FIG. 10 is a functional block diagram illustrating another exemplary way that the OSI component 1038 identifies the stream access IDs 242 that correspond to an original stream. The OSI component 1038 includes a plurality of rules 1062. A rule application component 1064 applies the rules 1062 to the content directory 1032 to make intelligent decisions about whether a particular stream access ID 242 corresponds to an original stream.

For example, if the content directory 1032 is a UPnP content directory 1032 provided by a UPnP content directory service 130, an exemplary rule 1062 may be the following. If the size and/or duration attribute for a <res> element stream out of multiple <res> elements for an object is zero or unknown or unspecified, but some other stream <res> element under the same object has these attributes defined, the stream <res> element with defined attributes is likely to be the original stream.

As another example, if the address information 344 for a stream access ID 242 includes an HTTP URI, the OSI component 1038 may be configured to send a HTTP GET request on the streams. In such a situation, an exemplary rule 1062 may be the following. If a response to the HTTP GET request sets no Content-Length header or if the response has a Transfer-Encoding chunked header, that stream is likely to be not an original stream. Similarly, if Content-Length is set in the response, that stream is likely to be an original stream. The HTTP connection may be terminated immediately after this header information is obtained, so as not to waste resources.

Figure 11:
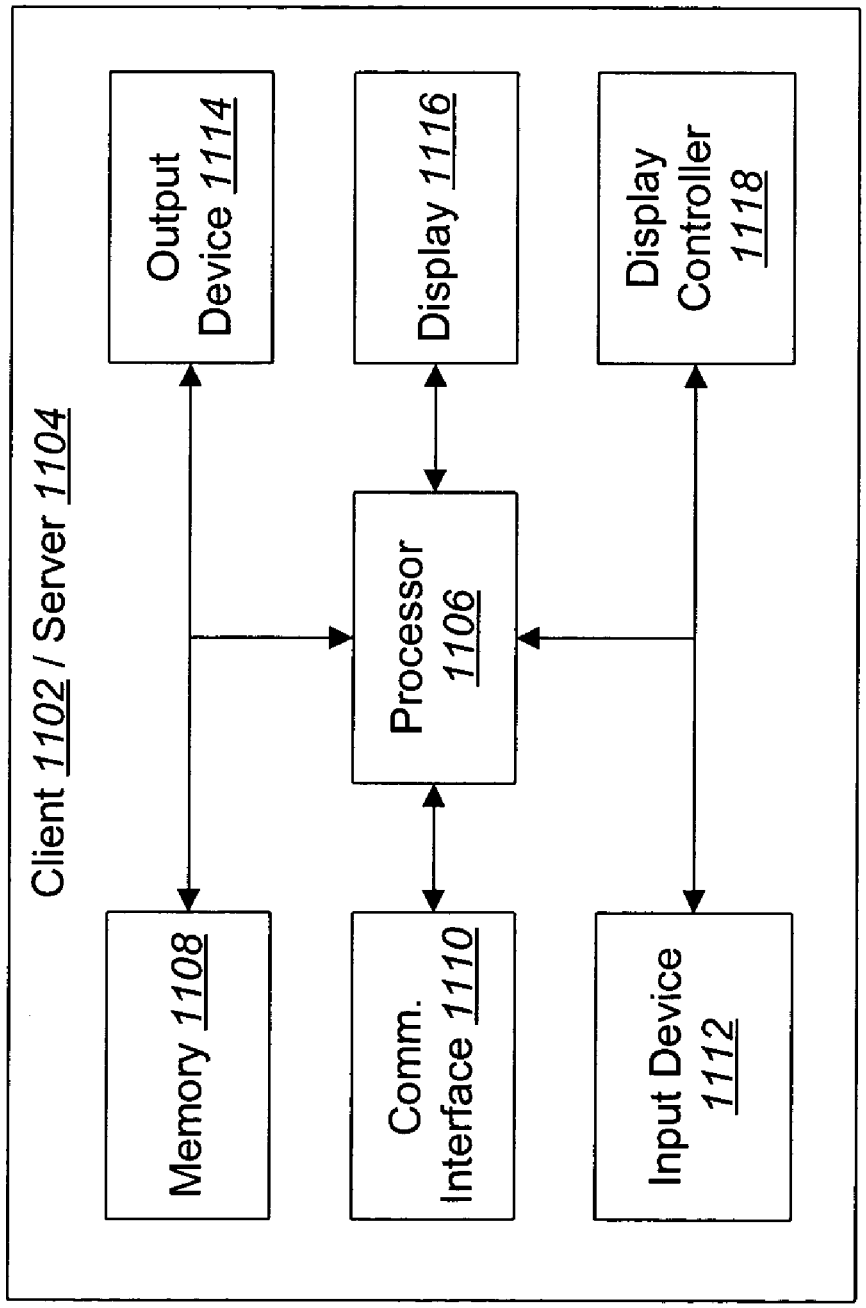
FIG. 11 is a block diagram illustrating the components typically utilized in a client system and/or a server system used with embodiments herein.

FIG. 11 is a block diagram illustrating the components typically utilized in a client system 1102 and/or a server system 1104 used with embodiments herein. The illustrated components may be logical or physical and may be implemented using any suitable combination of hardware, software, and/or firmware. In addition, the different components may be located within the same physical structure or in separate housings or structures.

The computer system shown in FIG. 11 includes a processor 1106 and memory 1108. The processor 1106 controls the operation of the computer system and may be embodied as a microprocessor, a microcontroller, a digital signal processor (DSP) or other device known in the art. The processor 1106 typically performs logical and arithmetic operations based on program instructions stored within the memory 1108.

As used herein, the term "memory" 1108 is broadly defined as any electronic component capable of storing electronic information, and may be embodied as read only memory (ROM), random access memory (RAM), magnetic disk storage media, optical storage media, flash memory devices in RAM, on-board memory included with the processor 1106, EPROM memory, EEPROM memory, registers, etc. Whatever form it takes, the memory 1108 typically stores program instructions and other types of data. The program instructions may be executed by the processor 1106 to implement some or all of the methods disclosed herein.

The computer system typically also includes one or more communication interfaces 1110 for communicating with other electronic devices. The communication interfaces 1110 may be based on wired communication technology, wireless communication technology, or both. Examples of different types of communication interfaces 1110 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system typically also includes one or more input devices 1112 and one or more output devices 1114. Examples of different kinds of input devices 1112 include a keyboard, mouse, remote control device, microphone, button, joystick, trackball, touchpad, lightpen, etc. Examples of different kinds of output devices 1114 include a speaker, printer, etc. One specific type of output device which is typically included in a computer system is a display device 1116. Display devices 1116 used with embodiments disclosed herein may utilize any suitable image projection technology, such as a cathode ray tube (CRT), liquid crystal display (LCD), light-emitting diode (LED), gas plasma, electroluminescence, or the like. A display controller 1118 may also be provided, for converting data stored in the memory 1108 into text, graphics, and/or moving images (as appropriate) shown on the display device 1116.

Of course, FIG. 11 illustrates only one possible configuration of a computer system. Those skilled in the art will recognize that various other architectures and components may be utilized. In addition, various standard components are not illustrated in order to avoid obscuring aspects of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a Universal Plug and Play (UPnP) server system having media content available for streaming, a method for distinguishing between an original format of the media content and a non-original format of the media content, the method being implemented by a UPnP service on a processor, the method comprising:

identifying at least one media content identifier in a media content directory, wherein the media content identifier identifies the media content;

identifying a plurality of stream access identifiers that are associated with the media content identifier, wherein the stream access identifiers identify different media data streams corresponding to the same media content, wherein the stream access identifiers comprise a first stream access identifier that corresponds to an original media data stream and a second stream access identifier that corresponds to a non-original media data stream, wherein the original media data stream corresponds to the original format of the media content and is streamed from the server system without transcoding or protocol translation being performed, wherein a client is configured to select the original media data stream over the non-original media data stream, but wherein the client is unable to determine which stream access identifier corresponds to the original media data stream;

receiving a request from the client to determine whether the first stream access identifier or the second stream access identifier corresponds to the original media data stream; and in response to receiving the request from the client, determining that the first stream access identifier corresponds to the original media data stream and notifying the client that the first stream access identifier corresponds to the original media data stream.

2. The method of claim 1, wherein determining that the first stream access identifier corresponds to the original media data stream comprises receiving user input.

3. The method of claim 1, wherein determining that the first stream access identifier corresponds to the original media data stream comprises matching a characteristic of the first stream access identifier to a similar characteristic of the media file.

4. The method as in claim 1, wherein determining that the first stream access identifier corresponds to the original media data stream comprises applying a rule to the plurality of stream access identifiers.

5. The method of claim 1, wherein the media content directory comprises an attribute that specifies whether a particular stream access identifier corresponds to the original media data stream.

6. The method of claim 5, wherein the first stream access identifier comprises the attribute.

7. A Universal Plug and Play (UPnP) sewer system including a processor and memory, the UPnP server system having media content available for streaming, comprising:
 a UPnP content directory service implementation;
 a media content directory maintained by the UPnP content directory service implementation, comprising:
  a media content identifier identifying media content; and
  a plurality of stream access identifiers that are associated with the media content identifier, wherein the stream access identifiers identify different media data streams corresponding to the same media content, wherein the stream access identifiers comprise a first stream access identifier that corresponds to an original media data stream and a second stream access identifier that corresponds to a non-original media data stream, wherein the original media data stream corresponds to an original format of the media content and is streamed from the server system without transcoding or protocol translation being performed, wherein a client is configured to select the original media data stream over the non-original media data stream, but wherein the client is unable to determine which stream access identifier corresponds to the original media data stream; and
 an original stream identification service implementation configured to:
  receive a request from the client to determine whether the first stream access identifier or the second stream access identifier corresponds to the original media data stream; and
  in response to receiving the request from the client, determine that the first stream access identifier corresponds to the original media data stream and notify the client that the first stream access identifier corresponds to the original media data stream.

8. The server system of claim 7, wherein determining that the first stream access identifier corresponds to the original media data stream comprises receiving user input.

9. The server system of claim 7, wherein determining that the first stream access identifier corresponds to the original media data stream comprises matching a characteristic of the first stream access identifier to a similar characteristic of the media file.

10. The server system of claim 7, wherein determining that the first stream access identifier corresponds to the original media data stream comprises applying a rule to the plurality of stream access identifiers.

11. The server system of claim 7, wherein the media content directory comprises an attribute that specifies whether a particular stream access identifier corresponds to the original media data stream.

12. The server system of claim 11, wherein the first stream access identifier comprises the attribute.

13. A computer readable medium that is part of a Universal Plug and Play (UPnP) server system having media content available for streaming, the computer-readable medium comprising instructions stored on the computer readable medium that are executable for identifying an original format of the media content, the instructions being executable to:
 identify at least one media content identifier in a media content directory, wherein the media content identifier identifies the media content;
 identify a plurality of stream access identifiers that are associated with the media content identifier, wherein the stream access identifiers identify different media data streams corresponding to the same media content, wherein the stream access identifiers comprise a first stream access identifier that corresponds to an original media data stream and a second stream access identifier that corresponds to a non-original media data stream, wherein the original media data stream corresponds to the original format of the media content and is streamed from the server system without transcoding or protocol translation being performed, wherein a client is configured to select the original media data stream over the non-original media data stream, but wherein the client is unable to determine which stream access identifier corresponds to the original media data stream;
 receive a request from the client to determine whether the first stream access identifier or the second stream access identifier corresponds to the original media data stream; and
 in response to receiving the request from the client, determine that the first stream access identifier corresponds to the original media data stream and notify the client that the first stream access identifier corresponds to the original media data stream.

14. The computer-readable medium of claim 13, wherein determining that the first stream access identifier corresponds to the original media data stream comprises receiving user input.

15. The computer-readable medium of claim 13, wherein determining that the first stream access identifier corresponds to the original media data stream comprises matching a characteristic of the first stream access identifier to a similar characteristic of the media file.

16. The computer-readable medium of claim 13, wherein determining that the first stream access identifier corresponds to the original media data stream comprises applying a rule to the plurality of stream access identifiers.

17. The computer-readable medium of claim 13, wherein the media content directory comprises an attribute that specifies whether a particular stream access identifier corresponds to the original media data stream.

18. The computer-readable medium of claim 17, wherein the first stream access identifier comprises the attribute.

* * * * *

UNITED STATES PATENT AND TRADEMARK OFFICE
CERTIFICATE OF CORRECTION

PATENT NO. : 7,574,514 B2 Page 1 of 1
APPLICATION NO. : 10/675033
DATED : August 11, 2009
INVENTOR(S) : Sachin G. Deshpande It is certified that error appears in the above-identified patent and that said Letters Patent is hereby corrected as shown below:

In Column 1, line 58 please replace "UPNP" with -- UPnP --.
In Column 5, line 53 please replace "upnP" with -- UPnP --.
In Column 9, line 12 please replace "Transfer-Encoding chunked" with
-- Transfer-Encoding : chunked --.
In Column 11, line 7, claim 7 please replace "sewer" with -- server --.

Signed and Sealed this

Nineteenth Day of January, 2010

David J. Kappos
*Director of the United States Patent and Trademark Office*